United States Patent [19]

Taylor et al.

[11] Patent Number: 5,616,358
[45] Date of Patent: Apr. 1, 1997

[54] STABLE BEVERAGES CONTAINING EMULSION WITH UNWEIGHTED OIL AND PROCESS OF MAKING

[75] Inventors: Matthew J. Taylor; Paul R. Bunke, both of Cincinnati; Phillip F. Pflaumer, Hamilton, all of Ohio

[73] Assignee: The Procter & Gamble Company, Cincinnati, Ohio

[21] Appl. No.: 504,166

[22] Filed: Jul. 19, 1995

[51] Int. Cl.⁶ .......................... A23L 1/0522; A23L 2/02; A23L 2/62
[52] U.S. Cl. .......................... 426/590; 426/578; 426/599; 426/602; 426/661
[58] Field of Search .................................. 426/590, 599, 426/602, 661, 578

[56] References Cited

U.S. PATENT DOCUMENTS

| | | | |
|---|---|---|---|
| 2,661,349 | 12/1953 | Caldwell et al. | 260/224 |
| 3,443,964 | 5/1969 | Marotta et al. | 99/83 |
| 3,455,838 | 7/1969 | Marotta et al. | 252/316 |
| 3,839,320 | 10/1974 | Bauer | 260/233.5 |
| 3,899,602 | 8/1975 | Rutenberg et al. | 426/578 |
| 3,971,852 | 7/1976 | Brenner et al. | 426/103 |
| 4,035,235 | 7/1977 | Richards et al. | 195/31 R |
| 4,428,972 | 1/1984 | Wurzburg et al. | 426/578 |
| 4,460,617 | 7/1984 | Barndt et al. | 426/609 |
| 4,479,971 | 10/1984 | Eng et al. | 426/330 |
| 4,835,002 | 5/1989 | Wolf et al. | 426/602 |
| 4,966,779 | 10/1990 | Kirk | 426/602 |
| 4,971,723 | 11/1990 | Chiu | 252/315.3 |
| 4,971,828 | 11/1990 | Abbas et al. | 426/661 |
| 4,977,252 | 12/1990 | Chiu | 536/102 |
| 5,089,171 | 2/1992 | Chiu | 252/315.3 |
| 5,185,176 | 2/1993 | Chiu | 426/651 |
| 5,194,284 | 3/1993 | Chiu et al. | 426/589 |
| 5,378,286 | 1/1995 | Chiu et al. | 127/36 |

FOREIGN PATENT DOCUMENTS

0553368A1  8/1993  European Pat. Off. .......... A23L 2/26

OTHER PUBLICATIONS

Woodroof et al.; Clouding Agents for Beverages; *Beverages: Carbonated and Noncarbonated;* AVI Publishing Co., Westport, CT, 1981; pp. 170–174.

Tan; Beverages Emulsions; *Food Emulsions;* Marcel Dekker, New York, NY; 1990; pp. 445–478.

King et al.; Modified starch encapsulating agents offer superior emulsification, film forming, and low surface oil; *Capsul –encapsulation/drying—Food Product Development;* Dec., 1976; pp. 54–57.

Fang et al.; Dimensions of the Adsorbed Layers in Oil–In–Water Emulsioins Stabilized by Caseins; *Journal of Colloid and Interface Science;* Academic Press, vol. 156, 1993; pp. 329–334.

Melillo et al.; Physical Factors Governing the Stabilization of Cloudy Beverages; *Food Prodyct Development;* Jun., 19977; pp. 108–110.

Reineccius; Carbohydrates for Flavor Encapsulation; *Food Technology;* Mar. 1991;pp. 144–149.

Tan et al.; Stability of Beverage Flavor Emulsiions; *Perfumer & Flavorist;* vol. 13, Feb./Mar. 1988; pp. 23–41.

Trubiano; Succinate and Substituted Succinate Derivatives of Starch; *Modified Starches: Properties and Users;* CRC Press, Boca Raton, FL; 1986; pp. 131–147.

*Primary Examiner*—Helen Pratt
*Attorney, Agent, or Firm*—Eric W. Guttag; Tara M. Rosnell

[57] ABSTRACT

The present invention relates to stable beverage products. The beverage products of the present invention comprise of an oil-in-water beverage emulsion which comprises an unweighted oil, water and a food grade stabilizer. The ratio of the stabilizer to the unweighted oil within the beverage emulsion is at least about 0.5:1. The mean particle size of the oil droplets present in the emulsion ranges from about 0.10 to about 0.30 microns. The particle size distribution of the oil droplets in the emulsion is such that less than about 3% (volume percent basis) of the particles have a particle size greater than about 0.39 microns and less than about 9% (volume percent basis) of the particles have a particle size of greater than about 0.34 microns The beverage products of the present invention further comprise a fruit juice and/or fruit or other flavor.

20 Claims, No Drawings

STABLE BEVERAGES CONTAINING EMULSION WITH UNWEIGHTED OIL AND PROCESS OF MAKING

TECHNICAL FIELD

The present invention relates to stable beverage products and processes for preparing them. The stable beverages of the present invention comprise an emulsion which contains an unweighted oil, water and a food-grade stabilizer. The emulsion has an optimal droplet size, and a particular ratio of stabilizer to oil, in order to provide both physical stability and opacity to the product.

BACKGROUND OF THE INVENTION

Beverage products with a cloudy or opaque appearance are well known in the art. The cloudy or opaque appearance of these beverage products is typically produced by incorporating a beverage emulsion into the beverage. Beverage emulsions can be classified as either flavor emulsions or cloud emulsions. Beverage flavor emulsions provide the beverage with flavor and cloudiness, whereas beverage cloud emulsions provide primarily cloudiness. Both types of beverage emulsions are composed of an oil phase and a water phase and they are classified as oil-in-water emulsions. In an oil-in-water emulsion the oil phase is uniformly dispersed in the continuous water phase in the form of fine droplets. It is this oil droplet dispersion that gives a beverage its cloudy or opaque appearance.

An emulsion is thermodynamically an unstable system which has a tendency to revert to its original state of two immiscible liquids (two phase system). If the oil phase is lighter than the aqueous phase of the beverage, it will separate and rise to the top of the container. This phenomenon is described as creaming and can manifest itself by an unsightly condition known as ringing in the neck of the bottle containing the beverage product. If the oil phase is heavier than the aqueous phase of the beverage, it will settle to the bottom of the container. This condition is referred to as sedimentation and usually appears as a sediment in the bottom of the bottle containing the beverage product.

In order to prevent ringing or creaming when the oil phase is lighter than the aqueous phase of the beverage, a weighting agent is typically incorporated into the oil phase of a beverage emulsion. Weighting agents can also be called density adjusting agents, because they are added to flavor oils in order to increase the oil phase density. They are materials that are oil soluble, that have little or no flavor of their own, and that have densities higher than flavor oils.

Prior to 1970 brominated vegetable oil (BVO) was the weighting agent of choice for beverage emulsions due in part to its high density. However, in 1970 BVO was banned in the United Kingdom because of concern about the accumulation of bromine in body fat from ingestion of BVO and was regulated by the Food and Drug Administration (FDA) in the United States to allow a maximum of 15 ppm in beverages. To impart a high degree of cloudiness to a beverage, such as approximately the amount of cloudiness in orange juice, for example, requires an amount of oil (delivered by the emulsion) that cannot be adequately weighted with BVO at its legal limitation at 15 ppm. In other words, BVO is ineffective at levels of 15 ppm or less at weighting emulsions that are used at relatively high levels in beverages to deliver relatively high levels of cloudiness.

Therefore, after the regulation of BVO, it was necessary for the beverage industry to find other appropriate materials for use as weighting agents. In the United States ester gum is a material approved by the FDA for use as a weighting agent but with a limit of 100 ppm maximum in beverages. In Canada, the permitted weighting agent is sucrose acetate isobutyrate, and for countries belonging to the Council of Europe, dammar gum. The shortcomings of all of these weighting agents are that none of them are universally approved by all countries and they have a much lower density than BVO. Because of the lower density of ester gum, sucrose acetate isobutyrate and dammar gum compared to BVO, beverages which contain emulsions containing these weighting agents tend to exhibit creaming or ringing. Moreover, like BVO, because their usage is limited, one cannot adequately weight the amount of oil needed in an emulsion to provide a high degree of cloudiness to a beverage. Furthermore, many consumers object to the presence of such additives in their food or beverage products. As a result, a stable beverage emulsion has become more difficult to make than when BVO could be used without limitation.

It has now been found, however, that it is possible to prepare stable beverage products which contain a cloud emulsion, but which do not require weighting agents. In order to provide stability to the beverage compositions herein without the use of weighting agents, the emulsion used herein has a particular ratio of stabilizer to oil and a particular mean particle size and particle size distribution for the oil droplets within the emulsion.

SUMMARY OF THE INVENTION

The present invention relates to stable beverage products. The beverage products of the present invention comprise an oil-in-water beverage emulsion which comprises an unweighted oil, water and a food grade stabilizer. The ratio of the stabilizer to the unweighted oil within the beverage emulsion is at least about 0.5:1. The mean particle size of the oil droplets present in the emulsion ranges from about 0.10 to about 0.30 microns. The particle size distribution of the oil droplets in the emulsion is such that less than about 3% (volume percent basis) of the particles have a particle size greater than about 0.39 microns and less than about 9% of the particles have a particle size of greater than about 0.34 microns (volume percent basis). The beverage products of the present invention further comprise a fruit juice and/or fruit or other flavor. The beverage products of the present invention are stable at temperatures ranging from about 32° C. to about 38° C. for at least about 1 month.

The present invention also relates to a process for preparing stable beverage products. This process comprises incorporation into a beverage of a beverage emulsion wherein the ratio of the stabilizer to the unweighted oil within the beverage emulsion is at least about 0.5:1, wherein the mean particle size of the oil droplets present in the emulsion ranges from about 0.10 to about 0.30 microns, and wherein the particle size distribution of the oil droplets in the emulsion is such that less than about 3% (volume percent basis) of the particles have a particle size greater than about 0.39 microns and less than about 9% of the particles have a particle size of greater than about 0.34 microns (volume percent basis).

DETAILED DESCRIPTION OF THE INVENTION

The present invention relates to stable beverage products. The beverage products of the present invention comprise a fruit juice and/or fruit or other flavor and a beverage emulsion. The beverage emulsion comprises an unweighted oil, water and a food grade stabilizer. The ratio of the stabilizer to the unweighted oil within the emulsion is at least about 0.5:1. The mean particle size of the oil droplets present in the emulsion ranges from about 0.10 to about 0.30 microns. The particle size distribution of the oil droplets in the emulsion is such that less than about 3% (volume percent basis) of the particles have a particle size greater than about 0.39 microns and less than about 9% of the particles have a particle size of greater than about 0.34 microns (volume percent basis). Beverage products which contain emulsions having the hereinbefore described ratio of stabilizer to oil, mean oil droplet size and particle size distribution will exhibit little or no sedimentation and little or no oil separation or ringing, even though the emulsion does not contain weighting agents.

The beverage products of the present invention can be carbonated or noncarbonated, but are preferably noncarbonated. As used herein, the term "noncarbonated" refers to beverage products which contain less than one volume of carbonation. If desired for manufacturing convenience, the product can be pressurized with nitrogen or other inert gases according to standard practice in the soft drink industry. The beverage products of the present invention can also be chilled or unchilled (e.g., stored at ambient temperatures), but are typically stored at ambient temperatures.

The present invention also relates to a process for preparing stable beverage products. This process comprises incorporation into the beverage of a beverage emulsion wherein the ratio of the stabilizer to the unweighted oil within the beverage emulsion is at least about 0.5:1, wherein the mean particle size of the oil droplets present in the emulsion ranges from about 0.10 to about 0.30 microns, and wherein the particle size distribution of the oil droplets in the emulsion is such that less than about 3% (volume percent basis) of the particles have a particle size greater than 0.39 microns and less than about 9% of the particles have a particle size of greater than about 0.34 microns (volume percent basis).

The beverage products of the present invention and a process for making these beverage products are described in detail as follows:

I. THE BEVERAGE PRODUCTS

The ingredients present in the beverages products of the present invention are described in detail as follows:

A. The Emulsion

The beverage products of the present invention must comprise a beverage emulsion. The emulsion can be a cloud emulsion or a flavor emulsion, but is preferably a cloud emulsion. In particular, the emulsion is an oil-in-water emulsion comprising an unweighted oil, water and a food grade stabilizer.

The unweighted oil component can comprise any unweighted digestible or nondigestible oil from any animal or vegetable source, including, for example, terpene hydrocarbons, vegetable oils, flavor oils, nondigestible polyol polyesters such as those described in U.S. Pat. No. 3,600,186; Mattson et al; Issued August 1971 and U.S. Pat. No. 4,005,195; Jandacek et al; Issued January 1977, both herein incorporated by reference, or mixtures thereof. For use herein, the unweighted oil component preferably comprises a vegetable oil. High oleic sunflower oil (HOSO) is especially preferred for use as the unweighted oil component herein. The unweighted oil component is typically present in an amount ranging from about 3% to about 12% by weight of the emulsion. Preferably, the unweighted oil component is present in an amount ranging from about 4 to about 8% by weight of the emulsion, more preferably from about 5 to about 7%.

The water component of the emulsion used in the beverage products herein is typically present in an amount ranging from about 70 to about 90% by weight of the emulsion. Preferably the water is present in an amount ranging from about 80% to about 87% by weight of the emulsion, more preferably from about 81 to about 85% by weight.

Any food-grade stabilizer known for use in beverage emulsions can be used as the food grade emulsion stabilizer in the emulsions described herein. The stabilizer can include, for example, hydrophilic colloidal stabilizers commonly known in the art such as gum arabic, gelatin, xanthan, locust bean, and pectin; anionic polymers derived from cellulose (e.g., carboxymethylcellulose), which are water soluble and tolerant of low pH's encountered in citrus fruits; various starch alkenylsuccinates, or mixtures thereof. However, the level of certain of these food grade stabilizers (e.g., gelatin, xanthan and pectin) is preferably minimized. Modified starches, which are treated so that they contain hydrophobic as well as hydrophilic groups, such as those described in U.S. Pat. No. 2,661,349 to Caldwell and Wurzburg, herein incorporated by reference, are preferred for use herein. Octenyl succinate modified starches such as those described in U.S. Pat. No. 3,455,838 to Marotta et al., and U.S. Pat. No. 4,460,617 to Barndt et al., herein incorporated by reference, are highly preferred.

Modified starches can be prepared by a standard esterification reaction of a starch and a reagent (e.g., substituted cyclic dicarboxylic acid anhydrides) where the reagent and the starch suspended in water are mixed under alkaline conditions. See, for example, *Modified Starches: Properties and Uses,* O. B. Wurzburg, editor, 1986, CRC Press, Boca Raton Fla., pages 136–137, herein incorporated by reference.

The stabilizer component of the emulsion used in the beverage products herein is typically present in an amount ranging from about 6 to about 15% by weight of the emulsion. Preferably the stabilizer is present in an amount ranging from about 7% to about 12% by weight of the emulsion, more preferably from about 8 to about 11% by weight.

The ratio of the stabilizer to the oil present in the emulsion is at least about 0.5:1. Typically, the ratio of the stabilizer to the oil present in the emulsion ranges from about 0.5:1 to about 3:1, preferably from about 0.8:1 to about 2:1, most preferably from about 1:1 to about 1.5:1. In general, as the ratio of stabilizer to oil within the emulsion increases within the range of from 0.5:1 to 3:1, the stability of the emulsion increases. Beverages which contain emulsions wherein the ratio of stabilizer to oil in the emulsion is lower than about 0.5:1 will not necessarily be stable (e.g., they may exhibit creaming or ringing). Although beverages products which contain emulsions wherein the ratio of stabilizer to oil present in the emulsion is greater than about 3:1 will probably be stable, increasing the ratio above about 3:1 does not appear to provide additional stability benefits and can increase the cost.

The mean particle size of the oil droplets present in the emulsion ranges from about 0.10 to about 0.30 microns, preferably from about 0.15 to about 0.25 microns, most preferably from about 0.18 to about 0.22 microns. The particle size distribution of the oil droplets in the emulsion is such that less than about 3%, preferably less than about 1%, most preferably less than 0.2% (volume percent basis) of the particles have a particle size greater than about 0.39 microns and less than about 9%, preferably less than about 3%, most preferably less than about 1% of the particles have a particle size of greater than about 0.34 microns (volume percent basis).

These parameters for the mean particle size and the particle size distribution of the oil droplets within the emulsion are critical to obtaining a stable unweighted emulsion in a flavored beverage. Unweighted emulsions in which the mean particle size of the oil droplets is greater than about 0.30 microns will not necessarily be stable, while unweighted emulsions in which the mean particle size of the oil droplets is less than about 0.10 microns will not necessarily have sufficient opacity, in the beverage products herein. Furthermore, unweighted emulsions in which more than about 3% of the oil droplets are larger than about 0.39 microns, and/or in which more than about 9% of the oil droplets are larger than about 0.34 microns, will not necessarily be stable in the beverage products herein, and the beverage products containing them can exhibit creaming or ringing.

The emulsion is typically included in the beverage products herein in an amount ranging from about 0.2 to about 5% by weight of the beverage product, preferably from about 0.5% to about 3%, most preferably from about 0.8% to about 2% by weight of the beverage product.

Oil-in-water emulsions of the type described herein, wherein the oil droplets have the mean particle size and particle size distribution hereinbefore described, can be prepared by any known method, such as, for example, subjecting the emulsion to high temperature and/or high pressure and/or multiple pass homogenization. A two-stage homogenizer, such as the Gaulin M3 (APV-Gaulin Co., Everett, Mass.) equipped with either the standard or cell disruption valve and with the second stage comprising about 10% of the total pressure, is especially preferred for use herein. In a two-stage homogenizer, the second stage provides controlled back pressure ensuring the maximum efficiency of the first stage, and at the same time it minimizes the possibility of clumping and coalescence of the oil droplets in the emulsion.

The pressure setting for the first stage homogenization is usually at least about 2500, typically from about 3000 to about 9000 psig, preferably from about 4000 to about 7000 psig. The emulsion is homogenized from about 2 to about 5 times (number of passes through the homogenizer), preferably about 3 times. The temperature of the emulsion ranges from about ambient to about 190° F. (88° C.), preferably between 100° F. (38° C.) and 150° F. (66° C.). In general as the temperature of the emulsion and the pressure at which the homogenizer is operated increases, the number of passes necessary to obtain the requisite particle size for the oil droplets within the emulsion decreases.

B. The Fruit Juice and/or Fruit or Other Flavor Component

The beverage products of the present type also typically include a fruit juice and/or fruit or other flavor component. The fruit juice can be any citrus juice, non-citrus juice or mixture thereof, which are known for use in beverage products. Examples of such fruit juices include, but are not limited to, non-citrus juices such as apple juice, grape juice, pear juice, nectarine juice, currant juice, raspberry juice, gooseberry juice, blackberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice and mixtures thereof. Other fruit juices, and nonfruit juices, such as vegetable or botanical juices, can be used as the juice component of the beverages herein.

The beverages prepared according to the present invention contain at least about 0.001%, typically from about 0.001% to about 80% of a fruit juice and/or fruit or other flavor, preferably from about 0.01% to about 20% fruit juice and/or fruit or other flavor, and more preferably from about 2% to about 10% fruit juice and/or fruit or other flavor. The fruit juice can be incorporated into the beverage product as a puree, comminute or as a single strength or concentrated juice. Most preferred is the incorporation of a fruit juice as a concentrate with a solids content (primarily as sugar solids) of between 20° and 80° Brix.

The beverage products of the present invention can also contain fruit or other flavors, alone or in combination with fruit juice.

C. Other Optional Ingredients

In addition to the beverage emulsifier and the fruit juice and/or fruit or other flavor component, the beverage products of the present invention also typically contain an added water component. The added water component can comprise up to about 99.8%, typically from about 20% to about 99.8% of the beverage, preferably from about 70 to about 99.8% of the beverage, and more preferably from about 80% to about 90%. For purposes of defining the beverage products prepared according to the process of the present invention, the added water component does not include water incidentally added to the beverage via other added materials, such as, for example, the fruit juice component or the emulsion.

The beverage products of the present invention can also optionally contain a sweetener. The sweetener can include, for example, maltose, sucrose, glucose, fructose, invert sugars and mixtures thereof. These sugars can be incorporated into the beverage products in solid or liquid form, but are typically incorporated as a syrup, more preferably as a concentrated syrup such as high fructose corn syrup. For purposes of preparing the beverage products described herein, these optional sweeteners can be provided to some extent by other components of the beverage products, such as by the fruit juice component, optional flavorants, and so forth. Sweeteners are typically employed in the process of the present invention in amounts ranging from about 0.01% to about 20%, more preferably from about 6% to about 14%, sugar solids by weight of the beverage products Preferred carbohydrate sweeteners for use in the beverage products of the present invention are sucrose, fructose, glucose, and mixtures thereof. Fructose can be obtained or provided as liquid fructose, high fructose corn syrup (HFCS), dry fructose or fructose syrup, but is preferably provided as high fructose corn syrup. High fructose corn syrup is commercially available as HFCS-42, HFCS-55 and HFCS-90, which comprise 42%, 55% and 90%, respectively, by weight of the sugar solids therein of fructose.

Optional artificial or noncaloric sweeteners can be used alone or in combination with carbohydrate sweeteners in the beverage products of the present invention. They include, for example, saccharin, cyclamates, acetosulfam, L-aspartyl-L-phenylanine lower alkyl ester sweeteners (e.g., aspartame). L-aspartyl-D-alanine amides disclosed in U.S. Pat. No. 4,411,930 to Brennan et al., L-aspartyl-D-serine amides disclosed in U.S. Pat. No. 4,399,163 to Brennan et al., L-aspartyl-L-1-hydroxymethyl-alkaneamide sweeteners disclosed in U.S. Pat. No. 4,338,346 to Brand, L-aspartyl-1-hydroxyethylakaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred sweetener is aspartame. Artificial or noncaloric sweeteners, if used, are typically employed in an amount ranging from about 0.01% to about 1%, preferably from about 0.05% to about 0.10% by weight of the beverage products.

The beverage products of the present invention can also optionally contain anti-microbial preservative(s). Any food grade preservative can suitably be used in the beverage products of the present invention. Suitable preservatives include sorbic acid, benzoic acid, alkali metal salts thereof, sodium polyphosphates, and mixtures thereof. Preferred preservatives include sorbic acid, potassium sorbate, sodium sorbate, sodium hexametaphosphate, and mixtures thereof. A mixture of potassium sorbate and sodium hexametaphosphate is most preferred for use herein. The preservative is typically present in an amount ranging from about 0.02% to about 0.3% by weight of the beverage product, preferably from about 0.04% to about 0.2%, more preferably from about 0.1% to about 0.2%.

The beverage products of the present invention can also optionally contain additional thickeners. Suitable thickeners for use in the process of the present invention include, for example, carboxymethylcellulose (CMC), xanthan gum, gellan, locust bean, guar, carrageenan, propylene glycol alginate, pectin, and mixtures thereof. CMC and xanthan gum, and in particular a blend of CMC and xanthan gum, is especially preferred for use herein. The thickener is typically present in an amount ranging from about 0.0025% to about 0.20%, preferably from about 0.0025% to about 0.1%, most preferably from about 0.005% to about 0.05%.

The beverage products of the present invention can also be fortified with various vitamins and minerals. Especially preferred are vitamins A, B, C, and E, although it is understood that other vitamins and minerals can also be used. The beverage products of the present invention can also contain a soluble calcium source comprising specific ratios of calcium, citrate and malate. See U.S. Pat. No. 4,737,375; Issued Apr. 12, 1988; to Nakel et al, which is herein incorporated by reference.

II. PREPARATION OF THE BEVERAGE PRODUCTS HEREIN

The stable beverage products of the present invention can be prepared by conventional methods for formulating dilute juice beverages. Methods for making dilute juice beverages, for example, are described in U.S. Pat. No. 4,737,375 to Nakel et al, which is herein incorporated by reference. Methods for making beverage products are also described by Woodroof and Phillips, *Beverages: Carbonated & Noncarbonated*, AVI Publishing Co. (rev. ed. 1981); and by Thorner and Herzberg, *Non-alcoholic Food Service Beverage Handbook*, AVI Publishing Co. (2nd ed. 1978), herein incorporated by reference.

One method for preparing the beverage products herein involves making a beverage concentrate, adding to it a sugar syrup, and then trimming the mixture with water, sugar syrup, and beverage concentrate to the desired material composition. In such a method, the beverage concentrate can be prepared by admixing to water a beverage emulsion of the type described herein, acidulant, water soluble vitamins, flavorants, including juice concentrates, and preservatives. The sugar syrup for use in preparing the beverage product is separately prepared by adding sugar syrup (e.g., high fructose corn syrup) to water, and then adding ascorbic acid and thickening agents to the syrup. Preservatives can be added to the resulting sugar syrup. The sugar syrup and the concentrate are combined to form a beverage product. It can then be packaged and stored, or pasteurized, packaged and stored, or packaged, sterilized, and stored, or sterilized, packaged, and stored. It is understood that other methods, such as the methods described hereinafter in the EXAMPLES section, can be used to prepare the beverage products herein.

The key process of the present invention is the incorporation into a beverage product of an unweighted emulsion of the type described herein. Other well known and conventional variations of the above described beverage formulation technique, therefore, can be used to prepare the beverage products herein.

The beverage products of the present invention are stable for at least about 1 month at 90°–100° F. (32°–38° C.), preferably at least about 2 months at 90°–100° F., most preferably at least about 3 months at 90–100 F. A beverage is considered to be stable for purposes of this invention until the bottle containing the beverage exhibits a continuous ting of at least 0.5 mm.

ANALYTICAL METHODS

Method for Measuring the Mean Particle Size and Particle Size Distribution of the Oil Droplets Within the Beverage Emulsion The size and distribution of the emulsion droplets are measured with a Horiba LA-900 Particle Size Distribution Analyzer (Horiba Instruments, Inc., Irvine, Calif.) using software version 1.81c. The Horiba quantitates the distribution of particles in 74 discrete channels within the overall particle size measurement range of 0.04 to 1200 microns (diameter of particles).

A sample of emulsion is added to the mixing chamber (which is filled with distilled water and with the circulation and agitation on), and allowed to disperse until the transmittance is approximately 90% (typically required several drops of emulsion). The dispersed sample is sonicated for 1 min, and then measured for 1 min. The results are displayed using form of distribution number one, a relative refractive index of 1.19, and the volume distribution base. Other similar measurement conditions are also applicable. The mean droplet size, which is the diameter in microns of the average oil droplet, is calculated. The % of the emulsion larger than 0.39 microns, and the % larger than 0.34 microns, is also calculated.

EXAMPLES

Examples of the stable beverages of the present invention, and of the emulsions comprising these beverages are set forth herein.

Emulsions 1–6 and Comparative Emulsion A are formulated as shown in Table I. Emulsions 1–6 are representative of the emulsions used in the beverages of the present invention, while Comparative Emulsion A represents an emulsion which is outside of the scope of the present invention. The vitamins and artificial colors are dissolved in water, and the modified starch is added slowly with high shear mixing and mixed until thoroughly dissolved. The acidulant is then added and mixed thoroughly until dissolved. The oil (a mixture of oil and oil-soluble vitamins) is added and mixed with high shear for sufficient time to thoroughly blend the mixture. The preservative is added and mixed until dissolved, and the mixtures are homogenized under the conditions set forth in Table I. The mean particle size and particle size distribution for the oil droplets dispersed within each emulsion are set forth in Table I.

Note that Emulsions 1 and 2 have the same formulation, but are homogenized under different conditions, and therefore have different particle size distributions. Likewise, Emulsions 3 and 4 have the same formulation, but are homogenized under different conditions. Likewise, Emulsions 6 and Comparative Emulsion A have the same formulation, but are homogenized under different conditions.

Beverages are then formulated as shown in Table II, using Emulsions 1–6 and Comparative Emulsion A. The thickener and the water are blended under high shear conditions until the thickener is thoroughly dissolved. The remaining ingredients are added with sufficient mixing to thoroughly dissolve each material. The beverages are sterilized and packed hot into glass bottles.

The stability for each of the beverage formulations is set forth in Table II. The beverages which contain Emulsions 1–6 of the present invention have a stability of at least about 1 month. The beverage which contains an emulsion in which the particle size distribution of the oil droplets within the emulsion is outside of the scope of the present invention (Comparative Emulsion A) has a stability of less than one month.

Note that Beverage 1 has the same composition as Beverage 2, Beverage 3 has the same composition as Beverage 4, and Beverage 6 has the same composition as Comparative beverage A.

TABLE I

Emulsion Preparation

| Ingredient (%) | Emulsion 1 | Emulsion 2 | Emulsion 3 | Emulsion 4 | Emulsion 5 | Emulsion 6 | Comparative Emulsion A |
|---|---|---|---|---|---|---|---|
| Water | 84.7 | 84.7 | 87.1 | 87.1 | 84.6 | 80.2 | 80.2 |
| Oil | 7.1 | 7.1 | 4.73 | 4.73 | 7.1 | 12.8 | 12.8 |
| Modified Starch | 7.1 | 7.1 | 7.1 | 7.1 | 7.1 | 7.1 | 7.1 |
| Vitamins | 0.05 | 0.05 | 0.04 | 0.04 | 0.13 | 0.09 | 0.13 |
| Artificial Colors | 0.06 | 0.06 | 0.04 | 0.04 | 0.06 | 0.11 | 0.11 |
| Acidulant | 0.75 | 0.75 | 0.75 | 0.75 | 0.75 | 0.86 | 0.86 |
| Preservative | 0.25 | 0.25 | 0.25 | 0.25 | 0.25 | 0.25 | 0.25 |
| Parameter | | | | | | | |
| Ratio of Starch:Oil | 1:1 | 1:1 | 1.5:1 | 1.5:1 | 1:1 | 0.55:1 | 0.55:1 |
| No. of passes through homogenizer | 2 | 3 | 2 | 3 | 3 | 3 | 3 |
| Homogenizer Pressure | 5000 | 5000 | 5000 | 5000 | 7000 | 7000 | 4000 |
| Temperature during Homogenization | ambient | ambient | ambient | ambient | ambient | ambient | ambient |
| Mean particle size ($\mu$) | 0.26 | 0.23 | 0.25 | 0.24 | 0.22 | 0.23 | 0.34 |
| % particle size >.39$\mu$ | 2.0 | 0.1 | 0.7 | 0.1 | 0.8 | 0.5 | 26.4 |
| % particle size >.34$\mu$ | 6.8 | 1.3 | 3.8 | 0.9 | 0.1 | 2.0 | 41.9 |

TABLE II

Beverage Preparation

| Ingredient (%) | Emulsion 1 | Emulsion 2 | Emulsion 3 | Emulsion 4 | Emulsion 5 | Emulsion 6 | Comparative Emulsion A |
|---|---|---|---|---|---|---|---|
| Emulsion | 3.0 | 3.0 | 4.5 | 4.5 | 3.0 | 1.7 | 1.7 |
| Water | 82.3 | 82.3 | 80.8 | 80.8 | 82.3 | 83.6 | 83.6 |
| Thickener | 0.1 | 0.1 | 0.1 | 0.1 | 0.1 | 0.1 | 0.1 |
| Sweetener | 12.8 | 12.8 | 12.8 | 12.8 | 12.8 | 12.8 | 12.8 |
| Acidulants | 0.70 | 0.70 | 0.70 | 0.70 | 0.60 | 0.60 | 0.60 |

TABLE II-continued

| | Beverage Preparation | | | | | | |
|---|---|---|---|---|---|---|---|
| Ingredient (%) | Emulsion 1 | Emulsion 2 | Emulsion 3 | Emulsion 4 | Emulsion 5 | Emulsion 6 | Comparative Emulsion A |
| Vitamins | 0.04 | 0.04 | 0.04 | 0.04 | 0.04 | 0.04 | 0.04 |
| Stability (months) | 1 | 1–2 | 1 | 5 | >4 | 4 | <1 |

Emulsions 7–9 and Comparative Emulsion B are formulated as shown in Table III. Emulsions 7–9 are representative of the emulsions used in the beverages of the present invention, while Comparative Emulsion B represents an emulsion which is outside of the scope of the present invention. The vitamins and artificial colors are dissolved in water, and the modified starch is added slowly with high shear mixing and mixed until thoroughly dissolved. The acidulant is then added and mixed thoroughly until dissolved. The oil is added and mixed with high shear for sufficient to thoroughly blend the mixture. The preservative is added and mixed until dissolved, and the mixtures are homogenized under the conditions set forth in Table III. The mean particle size and particle size distribution for the oil droplets dispersed within each emulsion are set forth in Table III.

Note that Emulsions 9 and Comparative Emulsion B have the same formulation, but are homogenized under different conditions, and therefore have different particle size distributions.

Beverages are then formulated as shown in Table IV, using Emulsions 7–9 and Comparative Emulsion B. To prepare the beverages, a concentrate is first prepared as follows: the thickener and the water are mixed under high shear conditions until the thickener is thoroughly dissolved. The remaining ingredients are added with sufficient mixing to thoroughly dissolve each material. The beverages are then prepared by adding the required amounts of water and concentrate together, and mixing thoroughly. (Note: for Emulsions 8 and 9 and Comparative A, the oil comprises a blend of oil and oil-soluble vitamins).

The stability for each of the beverage formulations is set forth in Table IV. The beverages which contain Emulsions 7–9 of the present invention have a stability of at least about 1 month. The beverage which contains an emulsion in which the particle size distribution of the oil droplets within the emulsion is outside of the scope of the present invention (Comparative Emulsion B) has a stability of less than one month.

Note that Beverage 9 has the same composition as Comparative Beverage B.

TABLE III

| | Emulsion Preparation | | | |
|---|---|---|---|---|
| Ingredient (%) | Emulsion 7 | Emulsion 8 | Emulsion 9 | Comparative Emulsion B |
| Water | 86.9 | 87.1 | 84.6 | 84.6 |
| Oil | 4.74 | 4.73 | 7.1 | 7.1 |
| Stabilizer | 7.1 | 7.1 | 7.1 | 7.1 |
| Vitamins | 0.042 | 0.05 | 0.04 | 0.04 |
| Artificial Colors | 0.06 | 0.4 | 0.06 | 0.06 |
| Preservative | — | 0.25 | 0.25 | 0.25 |
| Acidulant | 0.86 | 0.75 | 0.86 | 0.86 |

TABLE III-continued

| | Emulsion Preparation | | | |
|---|---|---|---|---|
| Ingredient (%) | Emulsion 7 | Emulsion 8 | Emulsion 9 | Comparative Emulsion B |
| Parameter | | | | |
| Ratio Starch:Oil | 1.5:1 | 1.5:1 | 1.0:1 | 1:1 |
| No. Passes thru homogenizer | 5 | 3 | 3 | 3 |
| Homogenizer Pressure | 3500 | 5000 | 7000 | 4000 |
| Temperature during Homogenization | ambient | ambient | ambient | ambient |
| Mean Particle Size (μ) | 0.24 | 0.22 | 0.21 | 0.27 |
| % Particle Size >.39μ | 0.1 | 0.0 | 0.0 | 3.5 |
| % Particle Size >.34μ | 1.6 | 0.5 | 0.6 | 11.2 |

TABLE IV

| | Beverage Preparation | | | |
|---|---|---|---|---|
| Ingredient (%) | Emulsion 7 | Emulsion 8 | Emulsion 9 | Comparative Emulsion B |
| Beverage Concentrate | | | | |
| Emulsion | — | 17.5 | 11.7 | 11.7 |
| Water | 33.0 | 24.6 | 30.5 | 30.5 |
| Fruit Juice Flavor | 4.9 | 4.0 | 4.0 | 4.0 |
| Thickener | 0.23 | 0.36 | 0.36 | 0.36 |
| Sweetener | 59.4 | 50 | 50 | 50 |
| Preservative | 0.81 | 0.62 | 0.62 | 0.62 |
| Acidulants | 1.48 | 2.7 | 2.7 | 2.7 |
| Vitamins | 0.18 | 0.004 | 0.004 | 0.004 |
| Beverage Blending | | | | |
| Emulsion | 2.84 | — | — | — |
| Water | 71.5 | 74.4 | 74.4 | 74.4 |
| Beverage Concentrate | 25.6 | 25.6 | 25.6 | 25.6 |
| Stability (months) | >1 | 3 | 3 | <1 |

What is claimed is:

1. Stable beverage products comprising:

(a) an oil-in-water beverage emulsion comprising an unweighted oil, water and a food-grade stabilizer comprising modified starch, wherein the ratio of the stabilizer to the oil within the emulsion is at least about 0.5:1.0, wherein the mean particle size of the oil droplets within the emulsion ranges from about 0.10 to about 0.30 microns, and wherein the particle size distribution of the oil droplets in the emulsion is such that less than about 3% (volume percent basis) of the particles have a particle size greater than about 0.39 microns and less than about 9% (volume percent basis)

of the particles have a particle size of greater than about 0.34 microns; and (b) a fruit juice and/or fruit or other flavor;

wherein the beverage products are stable for at least 1 month at temperatures ranging from about 32° to about 38° C.

2. The stable beverage products of claim 1 which comprise from about 0.2 to about 5% by weight of a beverage emulsion, from about 0.001 to about 80% of a fruit juice and/or fruit or other flavor and from about 20% to about 99.8% added water; wherein the beverage emulsion comprises:

(a) from about 3.0% to about 12.0% by weight unweighted oil;

(b) from about 70.0% to about 90.0% by weight water; and (c) from about 6.0% to about 15.0% by weight food grade stabilizer.

3. The stable beverage products of claim 2 wherein the food grade stabilizer is an octenyl succinate modified starch.

4. The stable beverage products of claim 3 wherein the beverage comprises from about 0.01 to about 20% of a fruit juice and/or fruit or other flavor and from about 70% to about 99.8% added water.

5. The stable beverage products of claim 4 wherein the beverage additionally contains from about 0.01 to about 20.0% by weight of a sweetener.

6. The stable beverage products of claim 5 wherein the beverage additionally comprises from about 0.0025% to about 0.2% of a thickener.

7. The stable beverage products of claim 6 wherein the ratio of the stabilizer to oil within the emulsion ranges from about 0.5:1 to about 3:1.

8. The stable beverage products of claim 7 wherein the particle size distribution of the oil droplets within the emulsion is such that less than about 1% of the particles have a particle size of greater than about 0.39 microns and less than about 3% of the particles have a particles size of greater than about 0.34 microns.

9. The beverage products of claim 8 wherein the mean particle size of the oil droplets within the emulsion ranges from about 0.15 to about 0.25 microns.

10. The beverage products of claim 9 which have a stability of at least about 2 months at temperatures ranging from about 32° to about 38° C.

11. The stable beverage products of claim 10 which additionally comprises from about 0.02 to about 0.30% by weight of a preservative, wherein the thickener comprises a blend of carboxymethylcellulose and xanthan gum, and wherein the unweighted oil within the emulsion comprises high oleic sunflower oil.

12. The stable beverage products of claim 11 which are noncarbonated.

13. The stable beverage product of claim 12 wherein the emulsion is passed through a homogenizer from two to five times and wherein the homogenizer is operated at a pressure ranging from about 3000 to about 9,000 psig and the emulsion is maintained at a temperature ranging from about ambient to about 88° C.

14. The stable beverage products of claim 13 wherein the homogenizer is operated at a pressure ranging from about 4000 to about 7000 psig.

15. A process for preparing stable beverage products which process comprises incorporating into the beverage an oil-in-water beverage emulsion, which emulsion comprises an unweighted oil, water and a food-grade stabilizer comprising modified starch, wherein the ratio of the stabilizer to the oil within the emulsion is at least about 0.5:1.0, wherein the mean particle size of the oil droplets within the emulsion ranges from about 0.10 to about 0.30 microns, and wherein the particle size distribution of the oil droplets in the emulsion is such that less than about 3% (volume percent basis) of the particles have a particle size greater than about 0.39 microns and less than about 9% (volume percent basis) of the particles have a particle size of greater than about 0.34 microns; and wherein the beverage additionally comprises a fruit juice and/or fruit or other flavor; and wherein the beverage products are stable for at least 1 month at temperatures ranging from about 32° to about 38° C.

16. The process of claim 15 wherein the beverage products comprise from about 0.2% to 5% of a beverage emulsion, from about 0.001 to about 80% of a fruit juice and/or fruit or other flavor and from about 20% to about 99.8% added water and wherein the beverage emulsion comprises:

(a) from about 3.0% to about 12.0% by weight unweighted oil;

(b) from about 70.0% to about 90.0% by weight water; and (c) from about 6.0% to about 15.0% by weight food grade stabilizer.

17. The process of claim 16 wherein the food grade stabilizer comprises an octenyl succinate modified starch.

18. The process of claim 17 wherein the beverage comprises from about 0.01 to about 20% of a fruit juice and/or fruit or other flavor and from about 70% to about 99.8% added water.

19. The process of claim 18 wherein the ratio of the stabilizer to oil within the emulsion ranges from about 0.5:1 to about 3:1.

20. The process of claim 19 wherein the emulsion is passed through a homogenizer from two to five times and wherein the homogenizer is operated at a pressure ranging from about 3000 to about 9,000 psig and the emulsion is maintained at a temperature ranging from about ambient to about 88° C.

* * * * *